United States Patent
Reiser et al.

(10) Patent No.: US 6,824,901 B2
(45) Date of Patent: Nov. 30, 2004

(54) END-CELL THERMAL DISTANCING FOR FUEL CELL SYSTEM

(75) Inventors: Carl A. Reiser, Stonington, CT (US); Gennady Resnick, South Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 54 days.

(21) Appl. No.: 10/225,527

(22) Filed: Aug. 21, 2002

(65) Prior Publication Data

US 2004/0038110 A1 Feb. 26, 2004

(51) Int. Cl.⁷ .......................... H01M 8/02; H01M 8/10
(52) U.S. Cl. .......................... 429/13; 429/26; 429/32; 429/37
(58) Field of Search .......................... 429/13, 26, 30, 429/32, 34, 37

(56) References Cited

U.S. PATENT DOCUMENTS

| | | | |
|---|---|---|---|
| 5,132,174 A | * 7/1992 | Romanowski et al. | 429/26 |
| 6,207,310 B1 | * 3/2001 | Wilson et al. | 429/26 |
| 2001/0036568 A1 | * 11/2001 | Farkash et al. | 429/26 |
| 2003/0211379 A1 | * 11/2003 | Morrow et al. | 429/37 |

* cited by examiner

Primary Examiner—Jonathan Crepeau
(74) Attorney, Agent, or Firm—Bachman & LaPointe, PC

(57) ABSTRACT

A PEM fuel cell system includes a plurality of PEM fuel cells arranged in a stack having two opposed, outwardly facing end surfaces; pressure plates positioned relative to said end surfaces for securing said PEM fuel cells in said stack; and spacer members between said end surfaces and said pressure plates for thermally insulating said end surfaces from said pressure plates.

15 Claims, 1 Drawing Sheet

END-CELL THERMAL DISTANCING FOR FUEL CELL SYSTEM

BACKGROUND OF THE INVENTION

The present invention relates to fuel cells and, more particularly to a system and method for improving fuel cell behavior during shutdown, which improves startup after exposure to sub-freezing conditions.

Electrochemical fuel cell assemblies such as proten exchange membrane (PEM) fuel cells are known for their ability to produce electricity and a subsequent reaction product through the reaction of a fuel being provided to an anode and oxidant being provided to a cathode, thereby generating a potential between these electrodes. Such fuel cell assemblies are very useful and sought after due to their high efficiency, particularly as compared to internal combustion fuel systems and the like. Fuel cell assemblies are additionally advantageous due to the environmentally friendly chemical reaction byproducts that are produced, such as water. In order to control the temperature within the fuel cell assembly, a coolant is provided to the fuel cell assembly, and this coolant may also typically be water. Thus, water circulates through the fuel cell assembly during operation of same.

One particularly attractive use for fuel cell assemblies is in vehicular applications. However, a critical problem in connection with such use is the sensitivity of the fuel cell assembly to sub-freezing temperatures, and the water circulating through a fuel cell assembly is particularly susceptible to freezing in the fuel cell and creating serious problems for subsequent startup.

A number of solutions to this problem have been attempted, mostly including methods for removing water from the fuel cell assembly before such water reaches a freezing temperature. Despite these efforts, the need remains for a fuel cell system which allows for rapid startup after sub-freezing conditions, without substantially increasing the size, cost or startup time of the fuel cell.

It is therefore the primary object of the present invention to provide such a fuel cell system.

SUMMARY OF THE INVENTION

In accordance with the present invention, the foregoing objects and advantages have been readily attained.

According to the invention, a PEM fuel cell system is provided, which comprises a plurality of PEM fuel cells arranged in a stack having two opposed, outwardly facing end surfaces; pressure plates positioned relative to said end surfaces for securing said PEM fuel cells in said stack; and spacer members between said end surfaces and said pressure plates for thermally insulating said end surfaces from said pressure plates.

The spacer members may advantageously be wettable, and preferably porous and/or permeable to water, and further preferably have a thermal conductivity which is less than the pressure plates, whereby (1) end surfaces of the fuel cell stack are thermally insulated from the pressure plates, and (2) water which migrates to end surfaces is captured by the spacer member.

In further accordance with the present invention, a method is provided for shutting down a PEM fuel cell system comprising a plurality of PEM fuel cells arranged in a stack having two opposed outwardly facing end surfaces and pressure plates positioned relative to said end surfaces for securing said PEM fuel cells in said stack, wherein said method comprises the steps of positioning spacer members between said end surfaces and said pressure plates for thermally insulating said end surfaces from said pressure plates; and cooling said PEM fuel cell system whereby said spacer members thermally insulate said end surfaces from said pressure plates thereby reducing migration of water toward said end surfaces.

BRIEF DESCRIPTION OF THE DRAWINGS

A detailed description of preferred embodiments of the present invention follows, with reference to the attached drawings, wherein.

DETAILED DESCRIPTION

The invention relates to proton exchange membrane (PEM) fuel cells and, more particularly, to a PEM fuel cell system with improved structure providing for shutdown and improved startup after being exposed to sub-freezing conditions.

As set forth above, and as is well known to a person of ordinary skill in the art, operation of PEM fuel cell systems results in water circulating throughout the fuel cell system. Upon shutdown of a fuel cell system, and exposure of the system to sub-freezing conditions, the water freezes, which causes significant problems during subsequent startup.

In accordance with the present invention, it has been discovered that the problem of water freezing within the fuel cell system is exacerbated by the fact that the fuel cell system does not cool uniformly, and in fact cools more quickly at end cells or surfaces which are exposed to typically large and thermally conductive pressure plates at end surfaces of the stack. This more rapid cooling at such end cells results in non-uniform water condensation in the stack and migration of water from centrally positioned cells to the end cells, and therefore a greater concentration of water in such end cells. When this water freezes, the end cells are completely blocked, and startup cannot be conducted until these cells are re-opened to fluid circulation.

Figure 1:
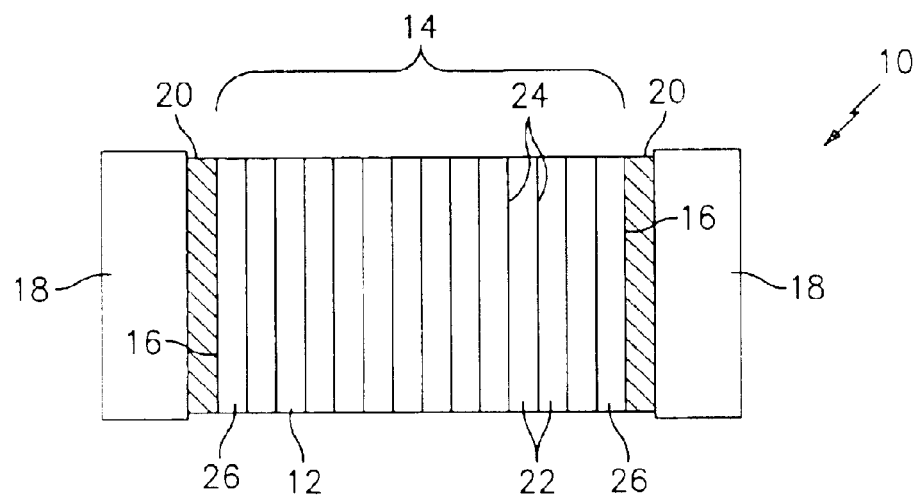
FIGS. 1 and 2 schematically illustrate a PEM fuel cell system including spacer members, in a side and a perspective view respectively, in accordance with the present invention.
Figure 2:
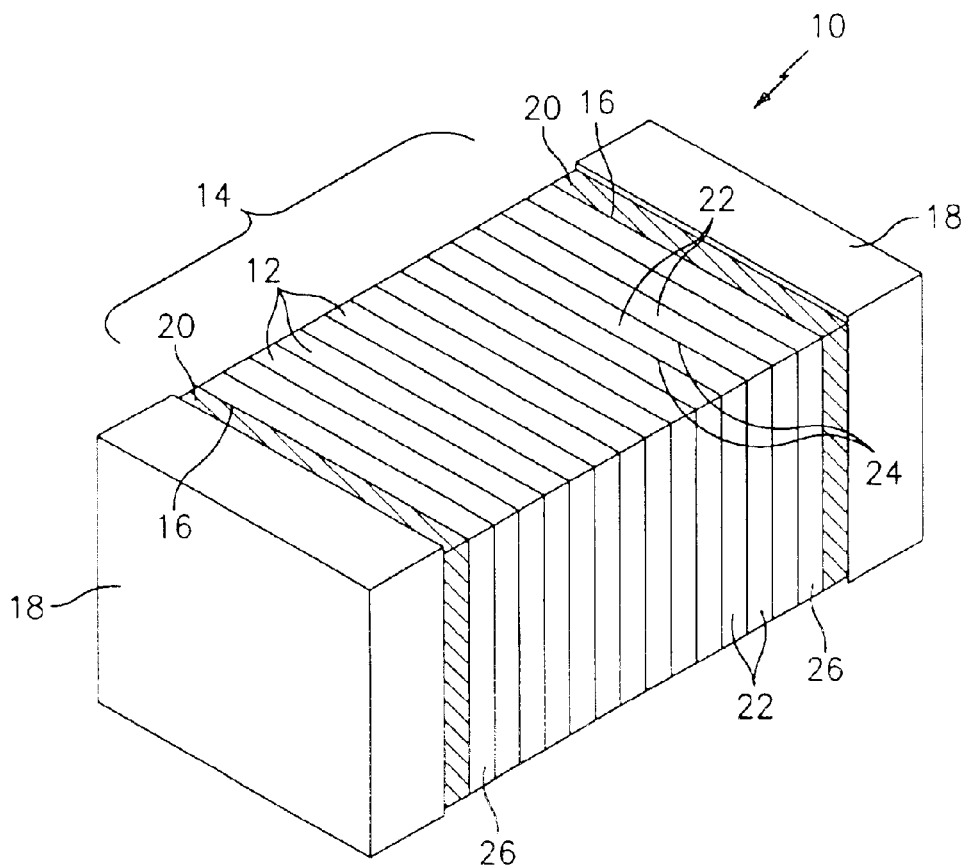

In accordance with the present invention, and as illustrated in FIGS. 1 and 2, a fuel cell system 10 is provided which comprises a plurality of fuel cells 12 arranged in a stack 14 having opposed, outwardly facing surfaces 16. As is well known to a person of ordinary skill in the art, pressure plates 18 are typically positioned relative to outwardly facing end surfaces 16, with various types of coupling structures (not shown), for securing stack 14 together. Pressure plates 18 must typically be large and structurally strong members since pressures within stack 14 can become quite high during operation.

It is this structure which causes rapid cooling of cells 12 near end surfaces 16 of stack 14.

In accordance with the present invention, and advantageously, spacer members 20 are positioned between pressure plates 18 and end surfaces 16, and these spacer members serve to thermally distance, or insulate, the end cells defining surfaces 16 from pressure plates 18, thereby at least reducing the more rapid cooling of these end cells caused by the thermal conductivity of pressure plates 18. This advantageously leads to more uniform cooling of fuel cell system 10 after shutdown, and thereby reduces or prevents migration of water toward surfaces 16 as desired. Thus, when system temperatures reach the water freezing point, the water is still distributed roughly equally through the stack and can freeze without preventing a rapid startup.

In accordance with the present invention, spacer members 20 are advantageously substantially flat wettable preferably porous members, and may preferably be porous graphite plates. The wetability, porosity, and preferably permeability to water, of plates 20 is advantageous because such wetability, porosity and permeability to water allow spacer members 20 to capture any water which does migrate toward end surfaces 16, whereby such water is prevented from freezing in operative cells 12 within stack 14.

Such plates 20 are also advantageous in that they do not interfere in any way with normal operation of fuel cell system 10 in accordance with the present invention.

Still referring to FIGS. 1 and 2, typical PEM fuel cells 12 are substantially planar members having edges 22 and substantially flat surfaces 24, and stack 14 comprises a plurality of such fuel cells 12 arranged with flat surfaces 24 substantially adjacent to flat surfaces 24 of the next cell 12 in stack 14. Thus, and as illustrated in FIGS. 1 and 2, an end cell 26 of stack 14 defines end surfaces 16 which are the surfaces from which pressure plates 18 are to be thermally distanced by spacer members 20 as desired, and in accordance with the present invention.

As set forth above, spacer members 20 may advantageously be provided as a substantially planar member, preferably having a thermal conductivity which is less than that of pressure plates 18. Further, and also as mentioned above, spacer members 20 can advantageously be provided as porous planar members, and this porosity is advantageous for several reasons. First, and as mentioned above, this porosity can lead to permeability which allows for containment of water which does migrate toward end surfaces. Second, the porosity can further reduce thermal conductivity of spacer members 20, and thereby further thermally distance pressure plates 18 from end cells 26 as desired.

A particularly preferred embodiment for spacer members 20 in accordance with the present invention is porous graphite plates, since such plates perform the desired functions without interfering with the normal operation of fuel cell system 10. Of course, other materials can be provided so long as they do not interfere with the take-off of power from end surfaces 16, and/or otherwise interfere with normal operation of fuel cell system 10 in accordance with the present invention.

In accordance with the present invention, it is preferred that spacer members have a porosity of at least about 30%, preferably between about 30% and about 80%, and more preferably between about 50% and about 75%.

Thermal distancing of end cells 26 from pressure plates 18 in accordance with the present invention serves to provide for more uniform cooling of end surfaces 16 as compared to side surfaces of stack 14 defined by edges 22 of fuel cells 12 therein. This advantageously serves to provide for a more uniform cooling of fuel cell system 10 after shutdown, leading to a more uniform water vapor pressure throughout the fuel cell system, and thereby leading to reduced migration which is driven by differences in water vapor pressure caused by more rapid cooling of end cells 26.

It should be appreciated that the system according to the invention provides for convenient startup after sub-freezing conditions without requiring expensive and/or bulky additional components.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A PEM fuel cell system, comprising:
   a plurality of PEM fuel cells arranged in a stack having two opposed, outwardly facing end surfaces;
   pressure plates positioned relative to said end surfaces for securing said PEM fuel cells in said stack; and
   spacer members between said end surfaces and said pressure plates for thermally insulating said end surfaces from said pressure plates, wherein said spacer members are wettable.

2. The system of claim 1, wherein said plurality of PEM fuel cells comprise a plurality of substantially planar PEM fuel cell elements each having side edges and opposed flat surfaces, said elements being stacked with said flat surfaces being substantially adjacent to each other whereby said edges define sides of said stack and opposed end elements define said end surfaces.

3. The system of claim 2, wherein said pressure plates have a thermal conductivity and wherein said spacer members have a spacer thermal conductivity which is less than said thermal conductivity of said pressure plates whereby said end surfaces are insulated from said pressure plates.

4. The system of claim 1, wherein said pressure plates have a thermal conductivity and wherein said spacer members have a spacer thermal conductivity which is less than said thermal conductivity of said pressure plates whereby said end surfaces are insulated from said pressure plates.

5. The system of claim 1, wherein said spacer members are porous and have a porosity of at least about 30%.

6. The system of claim 5, wherein said spacer members have a porosity of between about 30% and about 80%.

7. The system of claim 5, wherein said spacer members have a porosity of between about 50% and about 75%.

8. A PEM fuel cell system, comprising:
   a plurality of PEM fuel cells arranged in a stack having two opposed, outwardly facing end surfaces;
   pressure plates positioned relative to said end surfaces for securing said PEM fuel cells in said stack; and
   spacer members between said end surfaces and said pressure plates for thermally insulating said end surfaces from said pressure plates, wherein said spacer members are permeable to water, whereby water migrating to said spacer members remains in said spacer members.

9. A PEM fuel cell system, comprising:
   a plurality of PEM fuel cells arranged in a stack having two opposed, outwardly facing end surfaces;
   pressure plates positioned relative to said end surfaces for securing said PEM fuel cells in said stack; and
   spacer members between said end surfaces and said pressure plates for thermally insulating said end surfaces from said pressure plates, wherein said spacer members are porous graphite plates.

10. A method for shutting down a PEM fuel cell system comprising a plurality of PEM fuel cells arranged in a stack having two opposed outwardly facing end surfaces and pressure plates positioned relative to said end surfaces for securing said PEM fuel cells in said stack, said method comprising the steps of:
    positioning spacer members between said end surfaces and said pressure plates for thermally insulating said end surfaces from said pressure plates; and cooling said PEM fuel cell system whereby said spacer members thermally insulate said end surfaces from said pressure plates thereby reducing migration of water toward said end surfaces, wherein said spacer members are wettable.

11. The method of claim 10, wherein said spacer members are porous and have a porosity of at least about 30%.

12. The method of claim 11, wherein said spacer members have a porosity of between about 30% and about 80%.

13. The system of claim 11, wherein said spacer members have a porosity of between about 50% and about 75%.

14. A method for shutting down a PEM fuel cell system comprising a plurality of PEM fuel cells arranged in a stack having two opposed outwardly facing end surfaces and pressure plates positioned relative to said end surfaces for securing said PEM fuel cells in said stack, said method comprising the steps of:

positioning spacer members between said end surfaces and said pressure plates for thermally insulating said end surfaces from said pressure plates; and cooling said PEM fuel cell system whereby said spacer members thermally insulate said end surfaces from said pressure plates thereby reducing migration of water toward said end surfaces, wherein said spacer members are permeable to water, whereby water migrating to said spacer members remains in said spacer members.

15. A method for shutting down a PEM fuel cell system comprising a plurality of PEM fuel cells arranged in a stack having two opposed outwardly facing end surfaces and pressure plates positioned relative to said end surfaces for securing said PEM fuel cells in said stack, said method comprising the steps of:

positioning spacer members between said end surfaces and said pressure plates for thermally insulating said end surfaces from said pressure plates; and cooling said PEM fuel cell system whereby said spacer members thermally insulate said end surfaces from said pressure plates thereby reducing migration of water toward said end surfaces, wherein said spacer members are porous graphite plates.

* * * * *